US009047495B2

(12) United States Patent
Miller et al.

(10) Patent No.: US 9,047,495 B2
(45) Date of Patent: Jun. 2, 2015

(54) IDENTIFYING IMPACT OF A TRAFFIC INCIDENT ON A ROAD NETWORK

(75) Inventors: Mahalia Katherine Miller, Palo Alto, CA (US); Chetan Kumar Gupta, San Mateo, CA (US); Yin Wang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 13/460,203

(22) Filed: Apr. 30, 2012

(65) Prior Publication Data

US 2013/0289864 A1 Oct. 31, 2013

(51) Int. Cl.

*G06G 7/76* (2006.01)
*G06G 7/78* (2006.01)
*G06F 19/00* (2011.01)

(52) U.S. Cl.

CPC ... *G06G 7/76* (2013.01); *G06G 7/78* (2013.01)

(58) Field of Classification Search

USPC .......................................... 701/119, 117, 118
See application file for complete search history.

(56) References Cited

U.S. PATENT DOCUMENTS

| | | | | |
|---|---|---|---|---|
| 7,899,611 | B2 * | 3/2011 | Downs et al. | 701/117 |
| 7,974,808 | B2 | 7/2011 | Smith et al. | |
| 2006/0167617 | A1 * | 7/2006 | Krikelis | 701/117 |
| 2006/0182126 | A1 * | 8/2006 | Yuen et al. | 370/400 |
| 2007/0299601 | A1 * | 12/2007 | Zhao et al. | 701/201 |
| 2008/0004802 | A1 | 1/2008 | Horvitz | |
| 2008/0045242 | A1 * | 2/2008 | Dekock et al. | 455/456.2 |
| 2008/0140287 | A1 | 6/2008 | Yang et al. | |
| 2008/0162028 | A1 | 7/2008 | Satoh | |
| 2010/0188265 | A1 * | 7/2010 | Hill et al. | 340/905 |
| 2011/0037618 | A1 | 2/2011 | Ginsberg et al. | |
| 2011/0112747 | A1 * | 5/2011 | Downs et al. | 701/118 |
| 2011/0173015 | A1 * | 7/2011 | Chapman et al. | 705/1.1 |
| 2011/0202266 | A1 * | 8/2011 | Downs et al. | 701/119 |
| 2011/0224898 | A1 * | 9/2011 | Scofield et al. | 701/200 |
| 2011/0231091 | A1 * | 9/2011 | Gourlay et al. | 701/204 |
| 2012/0150425 | A1 * | 6/2012 | Chapman et al. | 701/119 |
| 2013/0223218 | A1 * | 8/2013 | Vasseur et al. | 370/232 |

FOREIGN PATENT DOCUMENTS

| | | |
|---|---|---|
| KR | 20040021878 A | 3/2004 |
| WO | WO 2010/107394 A1 | 9/2010 |

OTHER PUBLICATIONS

Abdel-Aty, M.A. et al, "Modeling traffic accident occurrence and involvement" Accident Analysis and Prevention, V32(5), 2000, pp. 633-642.
Bremmer et al., Measuring Congestion: Learning From Operational Data, Mar. 29, 2004 (19 pages).

(Continued)

*Primary Examiner* — Fadey Jabr
*Assistant Examiner* — Yazan A Soofi
(74) *Attorney, Agent, or Firm* — Pearl Cohen Zedek Latzer LLP

(57) ABSTRACT

A method and system for identifying impact of a traffic incident on a road network, wherein the impact may be measured in terms of a spatial-temporal-impact region, in terms of incident duration from the time the incident is reported to the time at which the affected road network returns to recurrent flow conditions, and in terms of a cumulative time delay of all affected drivers.

21 Claims, 4 Drawing Sheets

(56) References Cited

OTHER PUBLICATIONS

Chen et al., Detecting Errors and Imputting Missing Data for Single Loop Surveillance Systems, for Presentation and Publication, 82nd Annual Meeting, Transportation Research Board, Jan. 2003, Washington D.C., Aug. 1, 2002 (26 pages).
Chen, C. et al, "Statistical methods for estimating speed using single-loop detectors" Submitted to the 82nd Annual Mtg of the Transporation Research Brd, 2002 (17 pages).
Chung, Y et al, "Modeling Accident Duration and Its Mitigation Strategies on South Korean Freeway Systems", Jrnl of Tras Research Brd, V. 2178, 2010, pp. 49-57.
Hadayeghi et al., Macro-Level Accident Prediction Models for Evaluating the Safety of Urban Transportation Systems, 2003 (20 pages).
Jin, J et al, "Automatic Freeway Incident Detection Based on Fundamental Diagrams of Traffic Flow", Jrnl of Trans Research Brd, V 2099, pp. 65-75, 2009.
Khattak, A.J. et al, "Spatial Analysis of Modeling of Traffic Incidents for Proactive Incident Management and Strategic Planning", Jrnl of the Trans Research Brd, V2178, 2010, pp. 128-137.
Knoop V et al, "Incidents at Motorways: Capacity Reduction and the effects on Incident Mangement", EP Jrnl of Trans and Infrastructure Research, V.9(4), 2009, pp. 363-379.
Kwon et al., Components of Congestion: Delay from Incidents, Special Events, Lane Closures, Weather, Potential Ramp Metering Gain, and Excess Demand, University of California Transportation Center, University of California, Jan. 1, 2006 (9 pages).
Kwon et al., The Congestion Pie: Delay From Collisions, Potential Ramp Metering Gain, and Excess Demand, Transportation Research Board, 84th Annual Meeting, Washington DC, Jan. 2005 (21 pages).
Miller et al., Mining Traffic Incidents to Forecast Impact, UrbComp '12, Aug. 12, 2012 (8 pages).
Petty et al., The Freeway Service Patrol Evaluation Project: Database, Support Programs, and Accessibility, 1996 (26 pages).
Prevedouros, P.B et al, "Freeway Incidents int eh US, UK and Greece" Jrnl o fthe Tras Research Brd, V2047, 2008, pp. 57-65.
Sheu,J.B. "A fuzzy clustering-based approach to automatic freeway incident detection and characterization" Fuzzy Sets and Systems V128(3), 2002, pp. 377-388.
Skabardonis et al., Measuring Recurrent and Non-Recurrent Traffic Congestion, University of California Center, University of California, Jan. 1, 2008 (22 pages).
Victor L. Knoop, Road Incidents and Network Dynamics Effects on Driving Behavior and Traffic Congestion, 2009 (240 pages).
Williams et al., Short Papers—Traffic Management Center Use of Incident Detection Algorithms: Findings of a Nationwide Survey, IEEE Transactions on Intelligent Transportation Systems, vol. 8, No. 2, Jun. 2007 (8 pages).

* cited by examiner

IDENTIFYING IMPACT OF A TRAFFIC INCIDENT ON A ROAD NETWORK

BACKGROUND

The present invention relates generally to intelligent traffic management, and more specifically to identifying impact of traffic incident on a road network.

The impact areas and incident duration of traffic incidents have been estimated in the past on the basis of manual observation of the number of vehicles and injuries involved, or using automated means, identifying the impact area as it pertains to the particular network segment on which the incident occurred.

Another known method of estimation of temporal impact of traffic incidents involves merely subtracting the time stamps appearing on police reports at the beginning and the end of the traffic incident.

BRIEF DESCRIPTION OF THE DRAWINGS

The subject matter regarded as the invention is particularly pointed out and distinctly claimed in the concluding portion of the specification. The features, method of operation, primary components, and advantages of the present traffic management system may best be understood by reference to the following detailed description and accompanying drawings in which:

DETAILED DESCRIPTION

Figure 1:
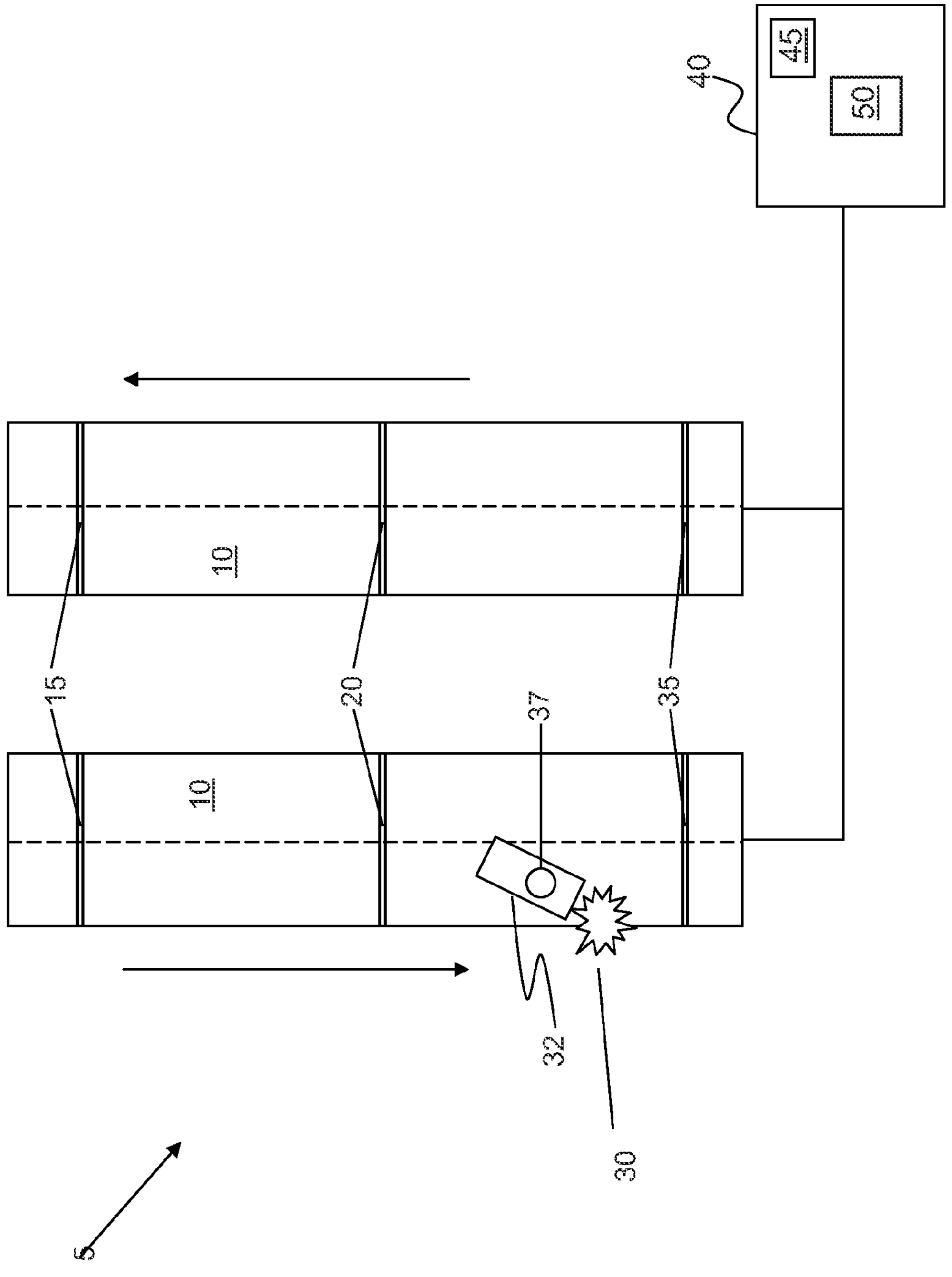
FIG. 1 is a schematic view of an example of a system for identifying impact of a traffic incident having data-capture devices configured to capture traffic-flow data that are linked to a computer system, according to an example of a traffic management system.

In the following detailed description, it will be understood by those skilled in the art that the present invention may be practiced without the particular details set forth in the specification for the purposes of clarifying the development. Furthermore, it should be appreciated that well-known methods, procedures, and components have not been described in detail to avoid obscuring the non-limiting description of the intelligent traffic management system.

Following is a description of an example of an intelligent traffic management system configured to estimate spatial-temporal-impact regions of a road network resulting from a traffic incident, as noted above.

Generally speaking, examples of the system include data-capture devices linked to a computerized processing unit and are configured to capture traffic data. The traffic data is then used to establish threshold traffic-flow velocities indicative of recurrent traffic-flow velocities associated with incident-free traffic. These threshold velocities are then used as a baseline for identifying non-recurrent traffic-flow velocities indicative of traffic congestion resulting from a traffic incident, according to examples Quantifying overall traffic-flow velocity for traffic is a complex process because traffic typically contains a diverse of number of vehicles traveling at various speeds changing with time and road conditions.

In more specific terms, the present examples of the system for identifying impact of a traffic incident on a road network may capture traffic data relating to individual vehicles by way of data-capture devices at data-capture times and render the traffic data into traffic-flow velocities representing the overall traffic-flow velocity at a specific data capture location and time, according to examples. The traffic-flow velocity may be derived from traffic data captured by data-capture devices configured to capture traffic data such as, inter alia, the number of vehicles passing a data capture location during a known time period, a flow occupancy (i.e. the fraction of the highway capacity filled with vehicles), or vehicular velocity.

The spatial-temporal-impact region is a dynamic region and may be defined by congested, contiguous sections of a road network. A congested state may be a condition in which the traffic-flow velocity determined from traffic data obtained at a specific data-capture device at a data capture-location and data-capture time is less than a threshold velocity associated with the same-data capture location and capture time, according to examples. The threshold velocity for each data-capture device and data-capture time may be defined as a recurrent traffic-flow velocity determined from traffic data obtained during a dedicated training period, according to examples.

Temporal expressions of impact may be measured in terms of incident duration or incident delay, according to examples. Incident duration of the impact time may be measured from the reported time of the traffic incident to the time at which the traffic-flow velocities of the affected road network return to recurrent conditions. Incident delay may be calculated as a cumulative delay of all drivers affected by the incident, as will be further discussed.

Additional definitions to be used throughout the document are as follows:

"Traffic incident" refers to any event that disrupts the normal flow of traffic and contributes to delay; examples include, inter alia, accidents, lane closures, curiosity slow-downs, and weather conditions.

"Recurrent traffic-flow velocity" refers to traffic-flow velocity associated with each data-capture device at data-capture times on incident free days.

"Congested state " refers to a road segment having a flow-averaged velocity less than a threshold or recurrent speed.

"Traffic-flow velocity", "v" at a data capture location "i" at time "t, or " v(i, t), refers to a flow-averaged velocity, calculated according to:

$$\frac{\sum_{k=1}^{N_l} q_k(i,t) v_k(i,t)}{\sum_{k=1}^{N_l} q_k(i,t)}$$

wherein,

"qk(i, t)" is flow rate for lane "k" in units of vehicles per hour at detector "i" at each time "t", lanes "k" vary from 1 to $N_1$, $v_k$ (i, t) is a velocity for each lane "k" at detector "i" at each time "t". It should be appreciated that $v_k$(i, t) is derived from induction loop detectors by way of example; however, vehicular velocities acquired by other means may be rendered into a flow averaged velocities by way of the above equation or other equations transforming individual velocities into an overall flow-averaged velocity.

"Upstream" refers to a direction opposing the traffic flow.

"Feature vector" refers to a feature used as a basis for a decision in machine learning models, including classification tree classification tree.

Turning now to the figures, FIG. 1 depicts an a system for identifying the impact of a traffic incident on a road network, according to an example, generally labeled 5, including road segment 10 and a plurality of stationary data-capture devices, 15, 20, and 25, disposed along road segment 10 and linked to a computing system 40.

Computing system 40 includes at least one processor 50 and output interface 45, according to examples. Stationary data-capture devices may include, for example, induction-loop sensors, cameras, radar units and mobile data-capture devices. Such mobile devices may include, for example, location-tracked mobile units 37 wirelessly linked to computing system 40 as shown in vehicle 32 involved in traffic incident 30.

In some examples, may be configured to capture the number of vehicles passing by at a particular time or to capture vehicular speed depending on the type of data-capture device. Computing system 40 may include an output interface 45 configured to display, transfer, or transmit traffic incident information either wirelessly or by way of a hard wire to relevant parties.

A non-limiting example of calculating threshold speed from preliminary traffic-flow data captured during a training period at road location "i" at time "t", hereinafter referred to as v*(i, t), is hereinafter detailed.

Threshold speed, v*(i, t) may be computed from incident-free conditions at a particular location "i" and time "t" and may be computed separately for each weekday and weekends with the assumption that v*(i, t) is periodic with a periodicity of a day, and each weekday and weekend days follow distinct and different patterns, according to examples. Thus, each detector "i" may have 288 weekday threshold values (e.g. based on 5 minute slots for 24 hours) and an equal number of threshold speed values for the weekend.

Time histories for each detector may be annotated to mark windows of time of incident-induced congestion to facilitate calculation of incident free behavior, i.e. recurrent velocities. Initially, all detectors may be marked as incident-free at all times of the day. From this starting point, the definition of "incident free" is iteratively updated to converge to v* values. The model for threshold speeds may be trained over training period of "k" days. The training process involves iterating over the "k" days from j=1 . . . m times. The v*(i, t) after iteration" are denoted $v_j$*(i, t).

The threshold traffic-flow velocity, v*(i, t) may then be calculated as the traffic-flow velocity for each detector location at a particular time from traffic data captured on incident free days using the formula for calculating the flow-averaged velocities noted above.

Examples of the intelligent transportation management system include provisions for identifying an incident location from police logs or weather reports inputted into an information provider linked to the system 5. The log may be parsed to ascertain the incident location and then mapped to the closest upstream sensor on a directed graph where upstream is defined as the opposite direction of traffic flow because the impact of an incident typically spreads upstream, i.e. there is a back-up behind an incident.

Figure 2:
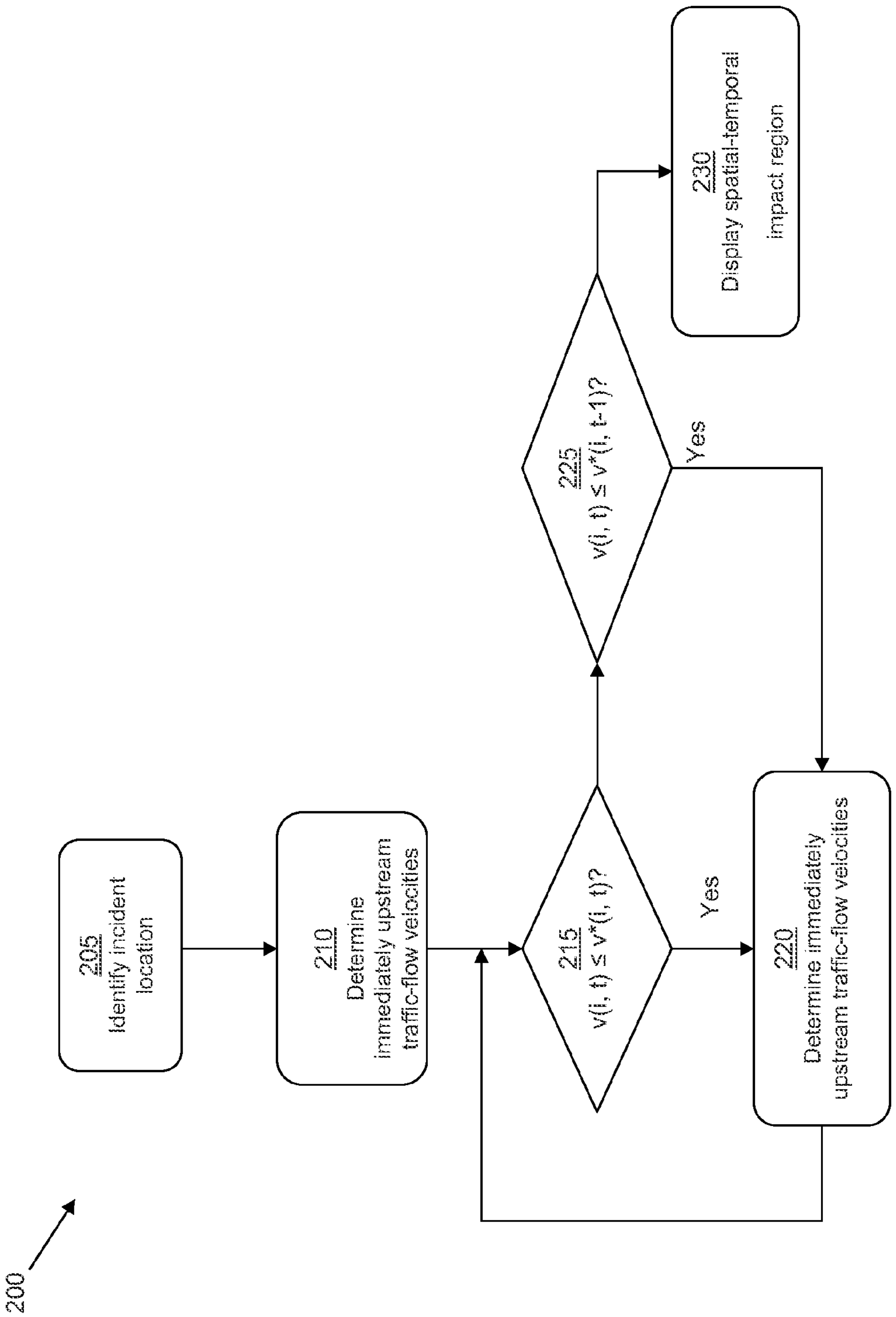
FIG. 2 is a flow chart depicting a process for identifying a spatial-temporal-impact area, according to examples.

A non-limiting example of identifying the spatial-temporal impact region is hereinafter detailed in the flowchart of FIG. 2 In step 205 an incident location is identified from a police report and the nearest upstream data-capture device is also identified, by way of a directed graph or any other means, according to examples.

In step 210, the system for identifying the spatial-temporal impact region may determine traffic-flow velocities at locations "i" upstream from the incident corresponding to data-capture devices 15, 20, and 35 of FIG. 1, according to examples. It should be appreciated that the traffic-flow velocity determination may be accomplished at processor 50 appearing in FIG. 1 or locally; at the data-capture devices when implemented as radar, for example.

In step 215, the system for identifying the spatial-temporal region may evaluate if the current traffic-flow velocity at the data-capture device located immediately upstream from the incident is less than the corresponding recurrent traffic-flow velocity for that specific data-capture device and data-capture time. A traffic-flow velocity less than the recurrent traffic-flow velocity indicates the spatial-temporal impact area has expanded to this data-capture location. Processing continues to step 220 where the system again collects traffic data at the next, data-capture device immediately upstream and determines traffic-flow velocity. The system reiterates the evaluation of step 215 and if the traffic-flow velocity is found to be indicative of congestion at that data-capture time, the system continues to check traffic flow conditions at the next upstream data-capture device as shown in step 220.

When the traffic-flow velocity at a data-capture device exceeds the corresponding recurrent traffic-flow velocity for the corresponding data capture time, processing proceeds to step 225, where the system evaluates if the traffic-flow velocity of the previous data-capture time, (i.e. at previous time step "t-1") was less than the corresponding recurrent traffic-flow velocity. If so, this data-capture device is also added to the set of data-capture devices enclosed in the spatial-temporal impact region and the system continues to obtain traffic data at the immediately upstream data-capture device as noted in step 220.

When the evaluation of step 225 indicates that the traffic-flow velocity of the previous time step was also equal to or exceeds the corresponding recurrent traffic-flow velocity, the boundary of the spatial-temporal impact region has been identified and the system terminates its search for additional data-capture devices and displays the identified region as noted in step 230, in either numerical or graphical form. It should be appreciated that certain examples of the system for identifying spatial-temporal impact regions display the identified impact region prior to identifying the boundary.

The following equation identifies a contiguous spatial-temporal impact region A' defined by the set of sensors, "$S_t$," at time step "t" of data-capture devices "u" at location "i" and time "t" or, u((i, t):

$$St=\{u(i,t)\}\mid v(i,t)<v^*(i,t)\wedge\exists e(k,i):k\in(St\cup(S\,t-1)\}$$

wherein "e" is the road segment between locations "k" and "i" and location "k" is immediately upstream from sensor at location "i".

The set of all data capture devices defining the spatial-temporal impact region may be described by:

$$S=\{\{u(i,t)\}\mid v(i,t)<v^*(i,t)\wedge v(i,t-1)<v^*(i,t-1)\wedge u(i,t-1)\text{ is in }S_{t-1},\text{ for }t\geq 1\}+S_0$$

wherein $S_0$ is the set including only the first upstream data-capture device from the traffic incident.

Figure 3C:
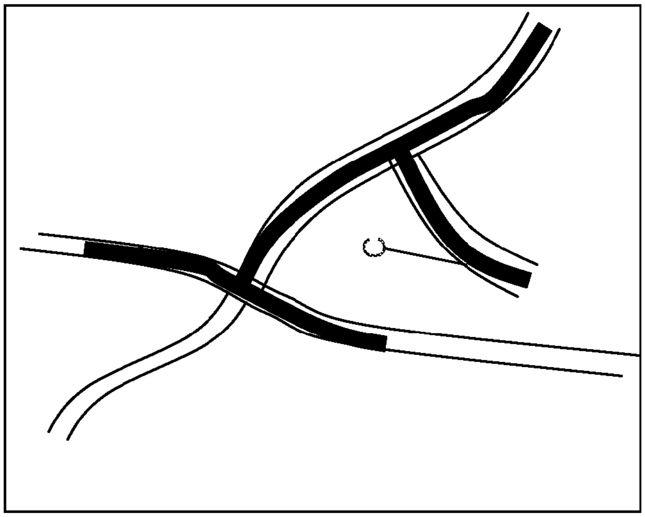
FIG. 3C is a graphical display of an extremely advanced stage of congestion resulting from a traffic incident, according to examples.
Figure 3B:
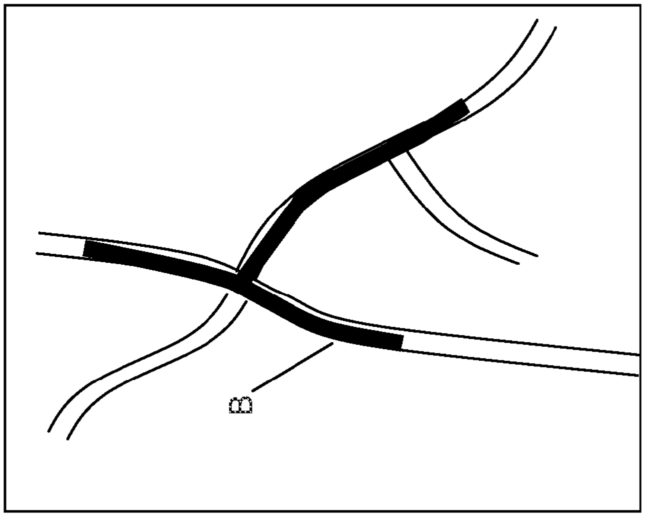
FIG. 3B is a graphical display of an advanced stage of congestion resulting from a traffic incident, according to examples.
Figure 3A:
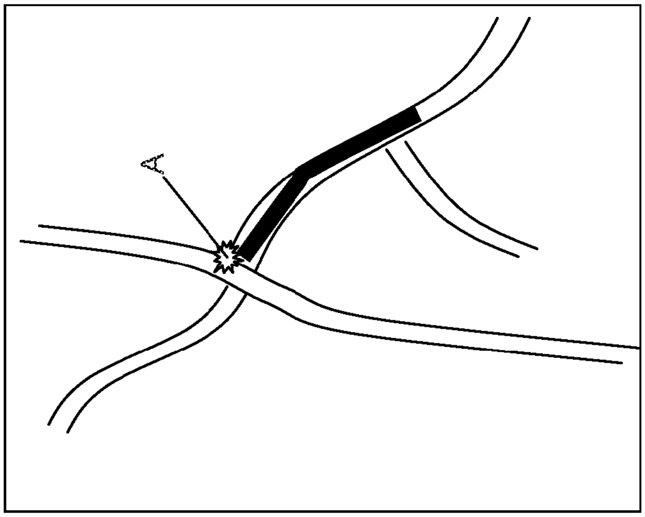
FIG. 3A is a graphical display of an early stage of congestion resulting from a traffic incident, according to examples.

FIG. 3A is a graphical representation a spatial-temporal impact region at early stages of congestion following a traffic incident at interaction point "A".

FIG. 3B is a graphical representation of the spatial-temporal impact region at an advanced stage of congestion in which both directions of traffic on intersecting road "B" have been impacted by the traffic incident at interaction point "A".

FIG. 3C is a graphical representation of the spatial-temporal-impact region at a highly advanced stage of congestion in which feeder road "C" has also become congested.

After determining the velocity at each data-capture device enclosed by the spatial-temporal impact region, examples of the system for identifying spatial-temporal impact region provide different metrics for temporal impact; such as incident delay and duration. As noted above, incident delay refers to a cumulative delay of all affected drivers. Incident delay is especially useful for calculating economic loss resulting from an a traffic incident and may be estimated by multiplying the incident delay by a monetary value per time basis.

The incident delay itself may be estimated according to the following relationship of $D_{inc}$:

If $v(i,t) < v^*(i,t)$ $$D_{inc} = \sum_{A'}\sum_{T'} l_i \times q(i,t) \times \left(\frac{1}{v(i,t)} - \frac{1}{v^*(i,t)}\right)$$

$$D_{rem} = \sum_{A-A'}\sum_{T-T'} l_i \times q_i(t) \times \left(\frac{1}{v_i(t)} - \frac{1}{v^*(i,t)}\right)$$

$$D_{rec} = \sum_{A}\sum_{T} l_i \times q(i,t) \times \left(\frac{1}{v^*(i,t)} - \frac{1}{v_{ref}(t)}\right)$$

If $v(i,t) \geq v^*(i,t)$ $$D_{inc} = D_{rem} = D_{rec}$$

$$Drec = \sum_{A}\sum_{T} l_i \times q(i,t) \times \max\left(\frac{1}{v^*(i,t)} - \frac{1}{v_{ref}(t)}, 0\right)$$

wherein, $D_{inc}$ is the "incident delay" emanating from the traffic incident. This delay type and other types of delay such as "remaining delay", $D_{rem}$, and "recurrent delay", $D_{rec}$ are measures of cumulative delays of all affected drivers. $D_{rem}$, refers to delays that cannot be accounted for by either the incident delays or the remaining delay.

Furthermore, refers to segment length beginning at location "i";

$q_i$ (t) refers to a vehicular flow-rate at time "t";

v(i, t) refers an traffic-flow velocity calculated as an averaged flow velocity derived from measurements at location "i" at time "t" as noted above.

v*(i, t) refers to a threshold traffic-flow velocity at location "i" at time "t";

A' refers to a spatial extent of the traffic incident;

T' refers to the temporal impact of the traffic incident, and $v_{ref}$ refers to a reference speed from which the delays are calculated. As noted above, the time exceeding the time required to travel a road segment at a reference speed is considered a delay. In non-limiting examples 60 mph. is chosen as the reference speed from which delays are measured.

The time delay is the time exceeding the time needed to travel a road segment when traveling at the reference speed.

A second measure of the temporal extent of a traffic incident is defined as the time period beginning from the time of the incident to the time at which traffic flow returns to recurrent flow conditions.

The incident duration may be calculated by tracking the time at which traffic-velocity flow at the data-capture devices bounding the spatial-temporal data flow return to recurrent velocities. The difference between the time at which this condition is met and the original reported incident time defines the incident duration, according to examples.

Computing system 50 of FIG. 1 may be configured to update the estimated incident duration and incident delay in real time as the boundary of the spatial-temporal impact region changes with time.

These temporal metrics may then be displayed or transmitted to a central location by way of output device 45 of FIG. 1 at which interested drivers can obtain near real-time updates together with the spatial-temporal impact as noted above.

Figure 4:
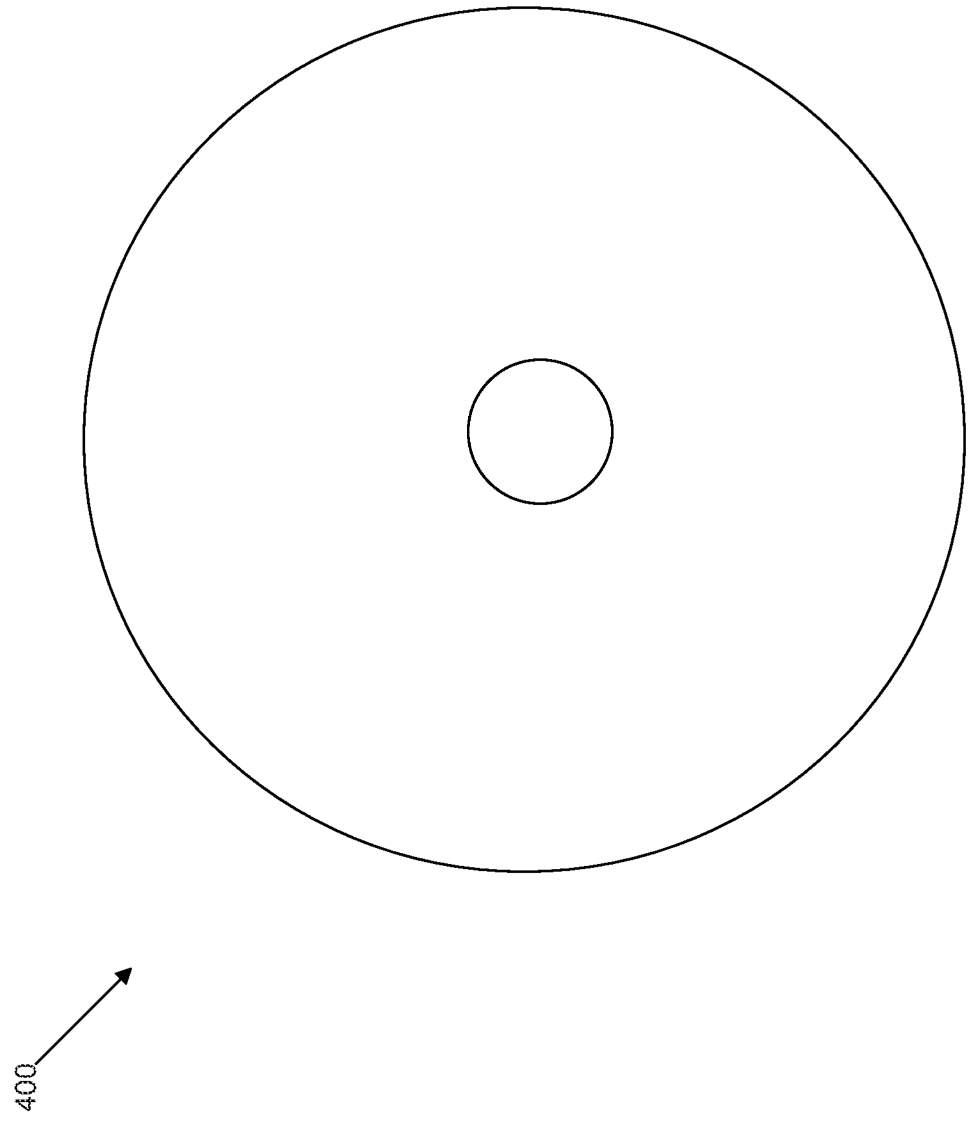
FIG. 4 is a CD ROM in which computer-executable instructions are encoded for modeling, spatial-temporal-impact area of traffic incidents, according to examples of the traffic management system.

FIG. 4 is a CD ROM in which computer-executable instructions are encoded for modeling spatial-temporal-impact area of traffic incidents, according to examples of the traffic management system.

It will be appreciated that for simplicity and clarity of illustration, elements shown in the figures have not necessarily been drawn to scale and reference numerals may be repeated in different figures to indicate corresponding or analogous elements.

What is claimed is:

1. A method comprising:
- receiving traffic data from a plurality of data-capture devices;
- calculating, by a system including a processor, a plurality of traffic-flow velocities, each velocity of the plurality of traffic-flow velocities being associated with a data-capture time and a respective data-capture device of the plurality of data-capture devices;
- identifying, by the system, a location of a traffic incident on a road network;
- determining, by the system, whether a traffic-flow velocity associated with a first one of the data-capture devices upstream of the location of the traffic incident is less than an associated threshold velocity;
- in response to determining that the traffic-flow velocity associated with the first data-capture device is less than the associated threshold velocity, iteratively performing until a specified condition is satisfied:
  - determining, by the system, whether a traffic-flow velocity associated with a further upstream data-capture device that is upstream of a previous data-capture device is less than a respective associated threshold velocity, each previous data-capture device associated with a traffic-flow velocity that is less than a respective associated threshold velocity, wherein the specified condition is satisfied when the traffic-flow velocity of a currently considered further upstream data-capture device is not less than the respective associated threshold velocity; and
- identifying, by the system based on the determining tasks, a boundary of a region affected by the traffic incident.

2. The method of claim 1, wherein each data-capture device from the data-capture devices is selected from the group consisting of a loop induction sensor, an image capture device, and a radar device.

3. The method of claim 1, wherein the data-capture devices include a location-tracked mobile device.

4. The method of claim 1, wherein each of the threshold velocities is calculated from respective preliminary traffic data captured during a training period.

5. The method of claim 1, further comprising displaying the region within the boundary affected by the traffic incident on an output device.

6. The method of claim 1, further comprising calculating a temporal metric of an impact of the traffic incident.

7. The method of claim 6, wherein the temporal metric includes an incident duration measured from a beginning of the traffic incident to a time at which the traffic-flow velocities associated with the first data-capture device and each further upstream data-capture device are equal to or greater than the respective associated thresholds velocities.

8. The method of claim 6, wherein the temporal metric includes an incident delay representing a cumulative delay of drivers affected by the traffic incident.

9. The method of claim 1 wherein receiving the traffic data comprises receiving traffic data from police logs or weather reports.

10. A system comprising:
- a plurality of data-capture devices disposed along a road network, the data-capture devices configured to capture traffic data;
- at least one processor configured to:
  - calculate a plurality of traffic-flow velocities from the traffic data, each of the traffic-flow velocities being associated with a data-capture time and a respective one of the data-capture devices;
  - identify a location of a traffic incident on the road network;
  - determine whether a traffic-flow velocity associated with a first one of the data-capture devices upstream of the location of the traffic incident is less than an associated threshold velocity;
  - in response to determining that the traffic-flow velocity associated with the first data-capture device is less than the associated threshold velocity, iteratively perform until a specified condition is satisfied:
    - determining whether a traffic-flow velocity associated with a further upstream data-capture device that is upstream of a previous data-capture device is less than a respective associated threshold velocity, each previous data-capture device associated with a traffic-flow velocity that is less than a respective associated threshold velocity, wherein the specified condition is satisfied when the traffic-flow velocity of a currently considered further upstream data-capture device is not less than the respective associated threshold velocity; and
  - identify, based on the determining tasks, a boundary of a region affected by the traffic incident.

11. The system of claim 10, wherein each data-capture device from the data-capture devices is selected from the group consisting of a loop induction sensor, an image capture device, and a radar device.

12. The system of claim 10, further comprising an output device configured to display the region within the boundary affected by the traffic incident.

13. The system of claim 10, wherein the at least one processor is configured to further calculate each of the threshold velocities from respective preliminary traffic data captured during a training period.

14. The system of claim 10, wherein the traffic data includes traffic data from police logs or weather reports.

15. The system of claim 10, wherein the at least one processor is configured to further calculate a temporal metric of an impact of the traffic incident.

16. A non-transitory computer-readable medium storing instructions which when executed by a system including a processor cause the system to:
- receive traffic data from a plurality of data-capture devices;
- calculate a plurality of traffic-flow velocities from the traffic data, each of the traffic-flow velocities being associated with a respective data-capture device and a data-capture time;
- identify a location of a traffic incident on a road network;
- determine whether a traffic-flow velocity associated with a first one of the data-capture devices upstream of the location of the traffic incident is less than an associated threshold velocity;
- in response to determining that the traffic-flow velocity associated with the first data-capture device is less than the associated threshold velocity, iteratively perform until a specified condition is satisfied:
  - determining whether a traffic-flow velocity associated with a further upstream data-capture device that is upstream of a previous data-capture device is less than a respective associated threshold velocity, each previous data-capture device associated with a traffic-flow velocity that is less than a respective associated threshold velocity, wherein the specified condition is satisfied when the traffic-flow velocity of a currently considered further upstream data-capture device is not less than the respective associated threshold velocity; and
- identify, based on the determining tasks, a boundary of a region affected by the traffic incident.

17. The non-transitory computer-readable medium of claim 16, wherein each data-capture device from the data-capture devices is selected from the group consisting of a loop induction sensor, an image capture device, and a radar device.

18. The non-transitory computer-readable medium of claim 16, wherein the instructions when executed cause the system to further display the region within the boundary affected by the traffic incident on a graphical output device.

19. The non-transitory computer-readable medium of claim 16, wherein the instructions upon execution cause the system to further calculate each of the threshold velocities from preliminary traffic-flow data captured by the data-capture devices during a training period.

20. The non-transitory computer-readable medium of claim 16, wherein the instructions when executed cause the system to further calculate a temporal metric of an impact of the traffic incident.

21. The method of claim 1, wherein iteratively performing the determining of whether the traffic-flow velocity associated with a further upstream data-capture device that is upstream of a previous data-capture device is less than a respective associated threshold velocity comprises iteratively performing the determining of whether the traffic-flow velocity associated with a successive further upstream data-capture device that is upstream of a previous data-capture device is less than a respective associated threshold velocity.

* * * * *